E. BENNETT.
Thill-Coupling.

No. 67,484.  Patented Aug. 6, 1867.

Witnesses:

Inventor;
Edwin Bennett

United States Patent Office.

EDWIN BENNETT, OF OXFORD, MICHIGAN.

Letters Patent No. 67,484, dated August 6, 1867.

---

IMPROVEMENT IN THILL AND POLE-COUPLING.

---

The Schedule referred to in these Letters Patent and making part of the same.

---

TO ALL WHOM IT MAY CONCERN:

Be it known that I, EDWIN BENNETT, of Oxford, in the county of Oakland, and in the State of Michigan, have invented certain new and useful Improvements in Thill and Pole-Coupling; and do hereby declare that the following is a full, clear, and exact description thereof, reference being had to the accompanying drawings, and to the letters of reference marked thereon.

Figure 1:
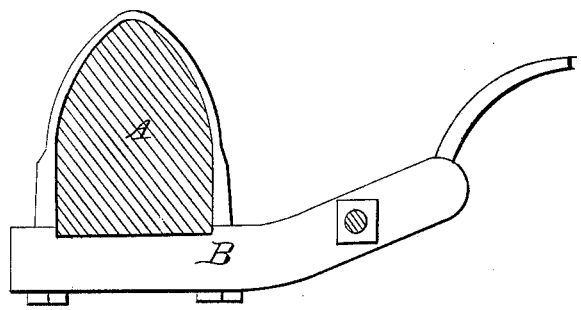
Figure 2:
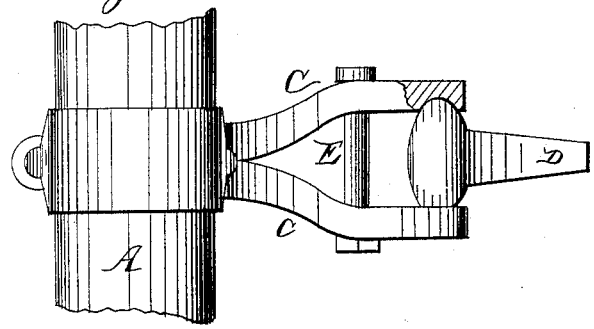
Figure 2:
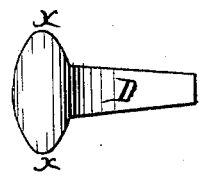

In the annexed drawings, making part of this specification, A represents a section of the axle of the vehicle. B represents the lower portion of the clip, which, after passing forward of the axle, is divided into two parts, C C, which are separated as represented in Figure 2. D represents the shaft-iron, the rear end of which is made egg-shaped, the two points $x$ $x$ of this end being caught between the two parts C C in sockets made to receive them. E represents a bolt, which passes through the two parts C C of the clip, and which is provided with a suitable nut for drawing the two parts C toward each other, for the purpose of clamping the end of the shaft-iron. By this arrangement a secure anti-friction connection is formed between the clips and the shaft-irons.

Having thus fully described my invention, what I claim as new, and desire to secure by Letters Patent, is—

The bar B, which is passed under the axle and spread at its forward part, to form a spring for clutching the egg-shaped shaft-iron by means of the bolt and screw E, for the purposes set forth.

In testimony that I claim the foregoing, I have hereunto set my hand this 22d day of May, 1867.

<div style="text-align:right">EDWIN BENNETT.</div>

Witnesses:
    L. W. STANTON,
    D. A. LAMPMAN.